(12) United States Patent
Lin

(10) Patent No.: US 7,938,684 B2
(45) Date of Patent: May 10, 2011

(54) ELECTRICAL CONNECTOR WITH ALIGNING MEANS AND ASSEMBLY COMBINATION THEREOF

(75) Inventor: Chien-Chen Lin, Taipei Hsien (TW)

(73) Assignee: Chief Land Electronic Co., Ltd., Taipei Hsien (TW)

( * ) Notice: Subject to any disclaimer, the term of this patent is extended or adjusted under 35 U.S.C. 154(b) by 311 days.

(21) Appl. No.: 12/222,615

(22) Filed: Aug. 13, 2008

(65) Prior Publication Data

US 2009/0318010 A1   Dec. 24, 2009

(30) Foreign Application Priority Data

Jun. 18, 2008 (TW) .................................. 97210782

(51) Int. Cl.
 *H01R 13/648* (2006.01)
(52) U.S. Cl. .............................. 439/607.4; 439/607.31
(58) Field of Classification Search .. 439/607.31–607.4, 439/607.53–607.56, 108
See application file for complete search history.

(56) References Cited

U.S. PATENT DOCUMENTS

| | | | | |
|---|---|---|---|---|
| 4,959,626 A * | 9/1990 | Mouissie | ...................... | 333/182 |
| 6,267,623 B1 * | 7/2001 | Hisamatsu | ............... | 439/607.35 |
| 6,319,060 B1 * | 11/2001 | Wu | .......................... | 439/607.13 |
| 6,439,926 B1 * | 8/2002 | Kuan | ......................... | 439/607.4 |
| 6,776,660 B1 * | 8/2004 | Kubota et al. | ............ | 439/607.17 |
| 7,244,149 B1 * | 7/2007 | Wang | ............................ | 439/629 |

* cited by examiner

*Primary Examiner* — Xuong M Chung Trans
(74) *Attorney, Agent, or Firm* — Rosenberg, Klein & Lee

(57) ABSTRACT

An electrical connector with an aligning means includes an insulating body, a plurality of terminals, a lower casing, and an aligning casing. The terminals are provided on the insulating body. The lower casing is provided on the bottom of the insulating body. The aligning casing is provided on the top of the insulating body. Both sides of the aligning casing are bent and extend to form two opposite aligning portions. Via the above arrangement, the electrical connector with an aligning means can be achieved and generate an aligning effect. Thus, the electrical connector having an aligning means can be inserted with a docking connector more quickly, and the contact therebetween will not become poor due to an external force. Furthermore, the work hours for assembling can be reduced. The present invention further provides an assembly combination of the electrical connector with aligning means.

13 Claims, 8 Drawing Sheets

ELECTRICAL CONNECTOR WITH ALIGNING MEANS AND ASSEMBLY COMBINATION THEREOF

BACKGROUND OF THE INVENTION

1. Field of the Invention

The present invention relates to an electrical connector having an aligning means and the assembly combination thereof, and in particular to an electrical connector having an aligning means and the assembly combination thereof that can be used in a light-emitting diode backlight source.

2. Description of Related Art

Please refer to FIGS. 1 to 3, which show a conventional electrical connector and the assembly combination thereof. The electrical connector and the assembly combination thereof can be used in a light-emitting diode backlight source. The electrical connector 1a includes an insulating body 10a, a plurality of terminals 11a, an upper casing 12a, and a lower casing 13a. The terminals 11a are assembled on the insulating body 10a. The upper casing 12a is a thin metallic sheet. The upper casing 12a covers the top of the insulating body 10a. The lower casing 13a is provided at the bottom of the insulating body 10a. The upper casing 12a and the lower casing 13a are soldered to each other, so that the terminals 11a are located between the upper casing 12a and the lower casing 13a and thus shielded.

The assembly combination of the electrical connector includes the above-mentioned electrical connector 1a and a docking connector 2a. The docking connector 2a is soldered on a printed circuit board 3a. The docking connector 2a has an insulating base 20a, a plurality of docking terminals 21a, and a metallic casing 22a. The docking terminals 21a are provided on the insulating base 20a. The metallic casing 22a covers the docking terminals 21a and the insulating base 20a. The insulating base 20a is provided with an insertion slot 201a. The front side of the electrical connector 1a is inserted into the insertion slot 201a, so that the terminals 11a can be brought into contact with the docking terminals 21a, thereby generating electrical connection.

Since the size of the front side of the insulating body 10a of the electrical connector 1a is usually smaller than that of the insertion slot 201a, a gap is formed between the insulating body 10a and the insulating base 20a. As a result, when the electrical connector 1a is inserted with the docking connector 2a, it is not easy to position/align these two connectors accurately and thus takes more time for assembly/connection. If an external force is applied, the electrical connector 1a may be deviated from the docking connector 2a, so that the contact between the terminals 11a and the docking terminals 21a will become poor.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide an electrical connector with an aligning means and the assembly combination thereof, which are simple in structure, easy to position/align accurately, and easy to assemble. Therefore, the work hours for assembling can be reduced.

In order to achieve the above objects, the present invention provides an electrical connector with an aligning means, which includes an insulating body; a plurality of terminals are provided on the insulating body; a lower casing is provided at the bottom of the insulating body; and an aligning casing is provided on the top of the insulating body, both sides of the aligning casing are bent and extending to form two opposite aligning portions.

The present invention further provides an assembly combination of an electrical connector with an aligning means, which includes an electrical connector with an aligning means and a docking connector. The electrical connector includes an insulating body, a plurality of terminals, a lower casing, and an aligning casing. The terminals are provided on the insulating body. The lower casing is provided at the bottom of the insulating body. The aligning casing is provided on the top of the insulating body. Both sides of the aligning casing are bent and extending to form two opposite aligning portions. The docking connector has an insulating base, a plurality of docking terminals, and a metallic casing. The insulating base has an insertion slot. The docking terminals are provided on the insulating base. The metallic casing covers the docking terminals and the insulating base. The terminals of the electrical connector are inserted into the insertion slot and electrically connected with the docking terminals. The aligning portion of the aligning casing abuts on both sides of the metallic casing.

The present invention has advantageous features as follows. Since both sides of the aligning casing of the electrical connector with an aligning means are bent and extending to form two opposite aligning portions, therefore the two aligning portions can abut on both sides of the metallic casing of the docking connector, and thereby generating an aligning effect. In this way, the electrical connector with an aligning means can be inserted with the docking connector more quickly. The contact between these two connectors will not become poor due to an external force, thereby reducing the work hours for assembling.

In order to further understand the characteristics and technical contents of the present invention, a detailed description relating thereto will be made with reference to the accompanying drawings. However, the drawings are illustrative only, and are not used to limit the scope of the present invention.

DETAILED DESCRIPTION OF THE PREFERRED EMBODIMENTS

Figure 1:
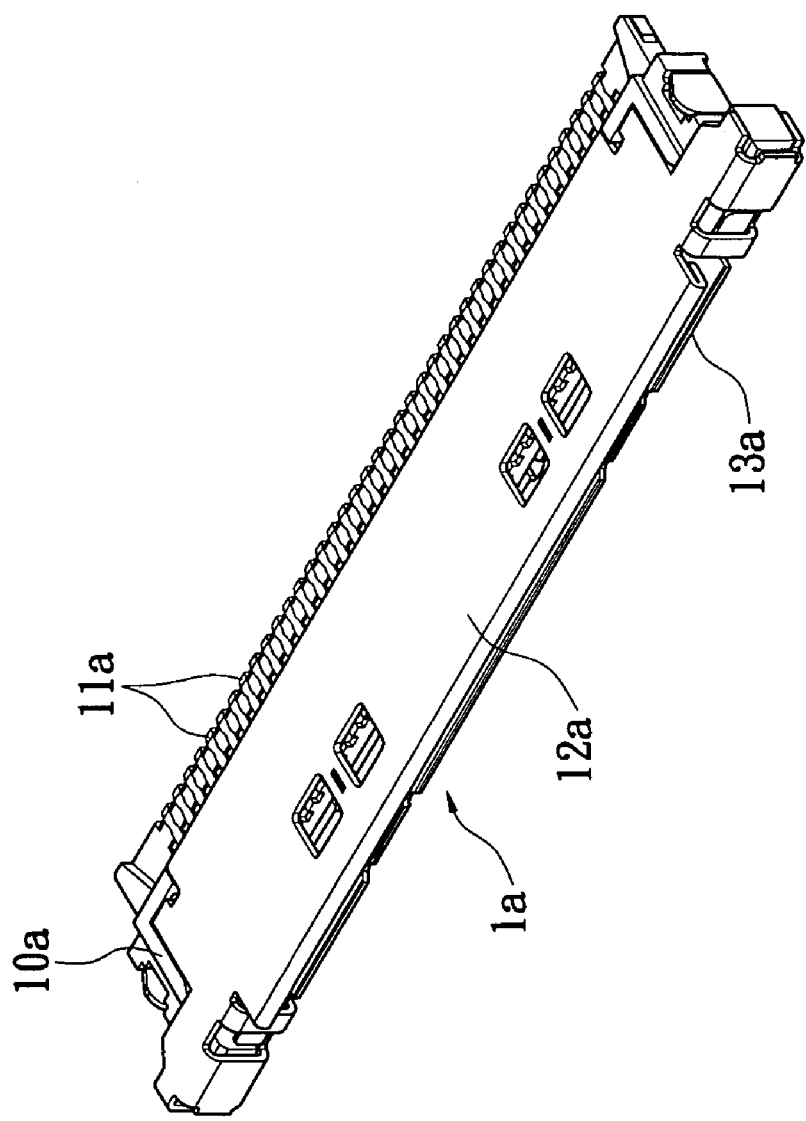
FIG. 1 is a perspective view showing a conventional electrical connector.
Figure 2:
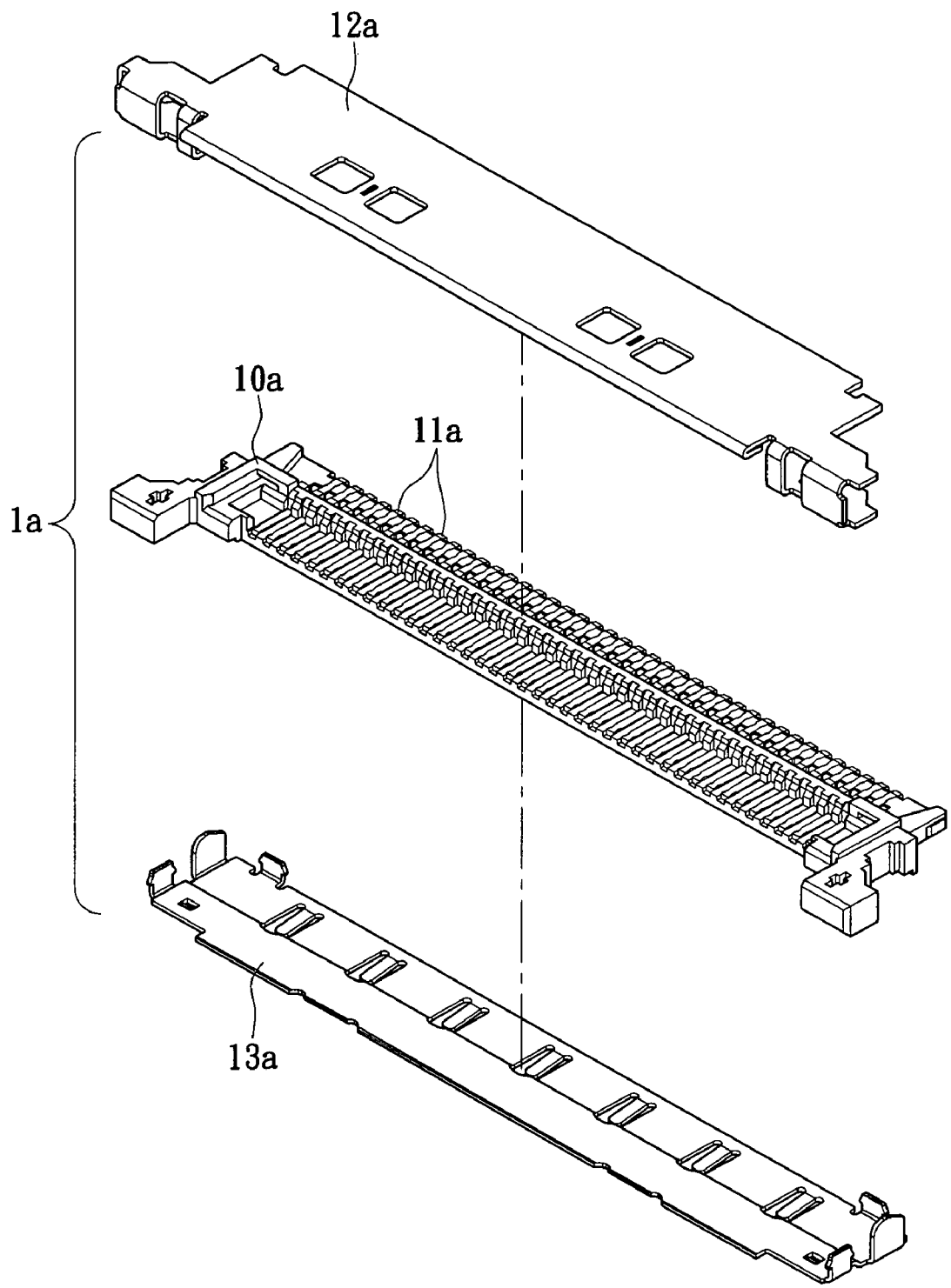
FIG. 2 is an exploded perspective view showing a conventional electrical connector.
Figure 3:
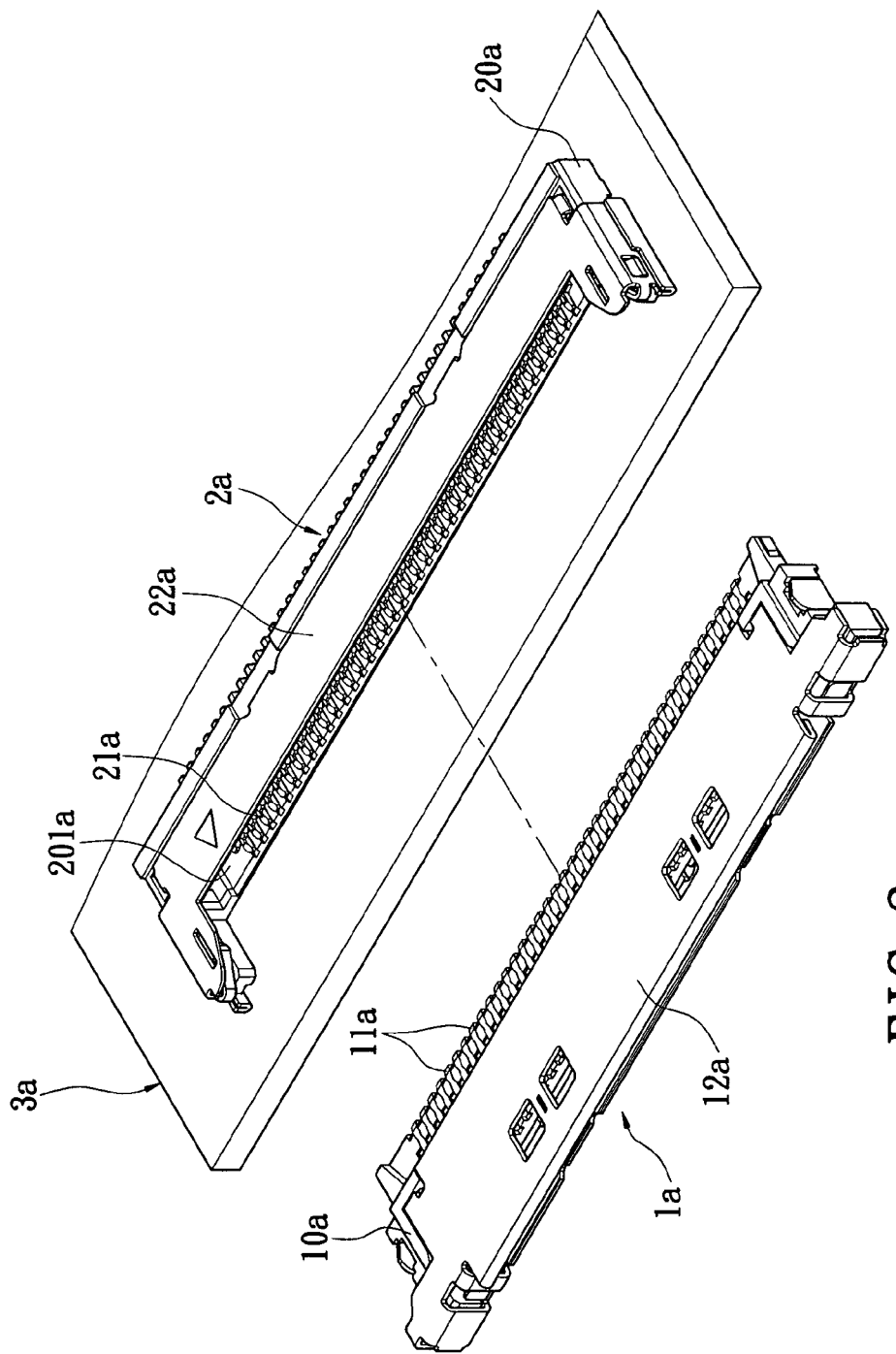
FIG. 3 is a schematic view showing a conventional assembly combination of an electrical connector.
Figure 4:
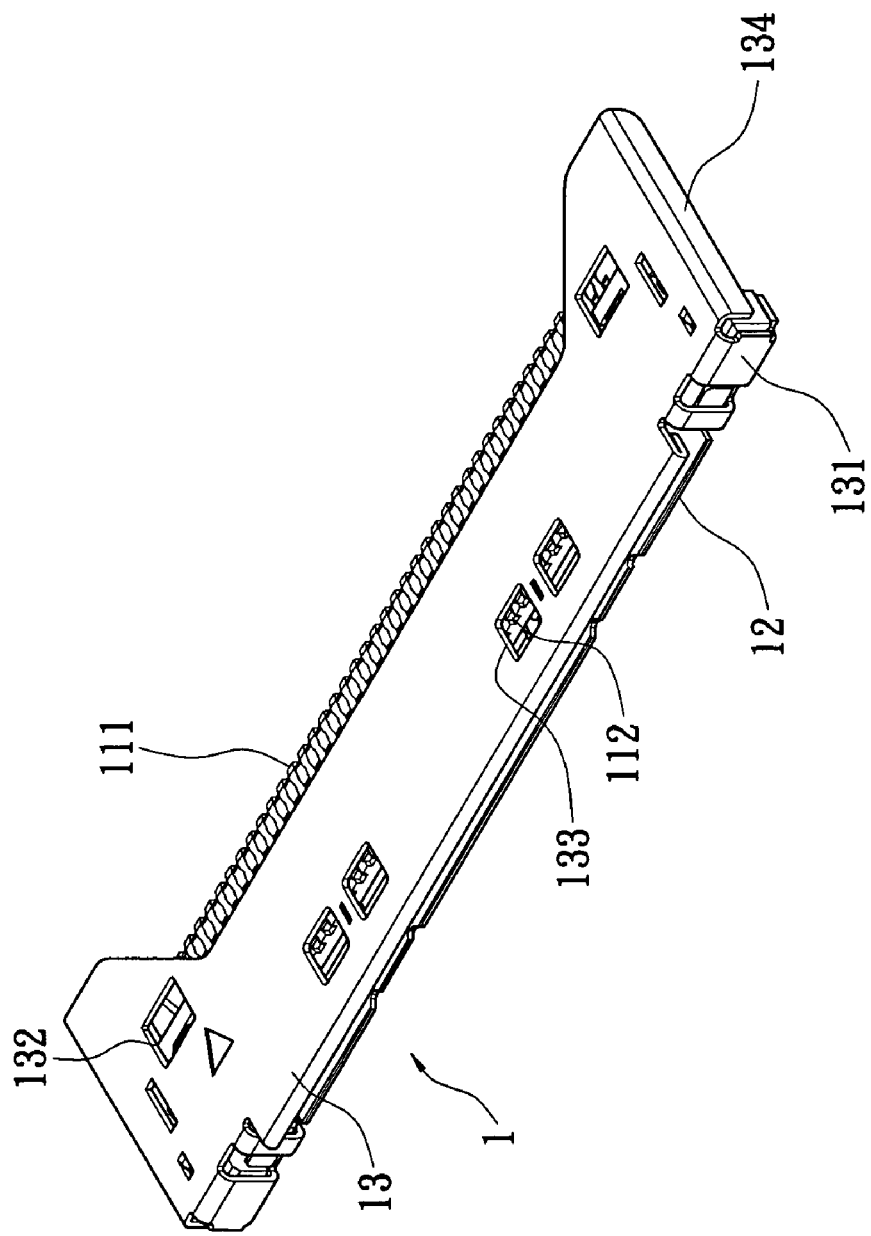
FIG. 4 is a perspective view showing the electrical connector with an aligning means according to the present invention.
Figure 5:
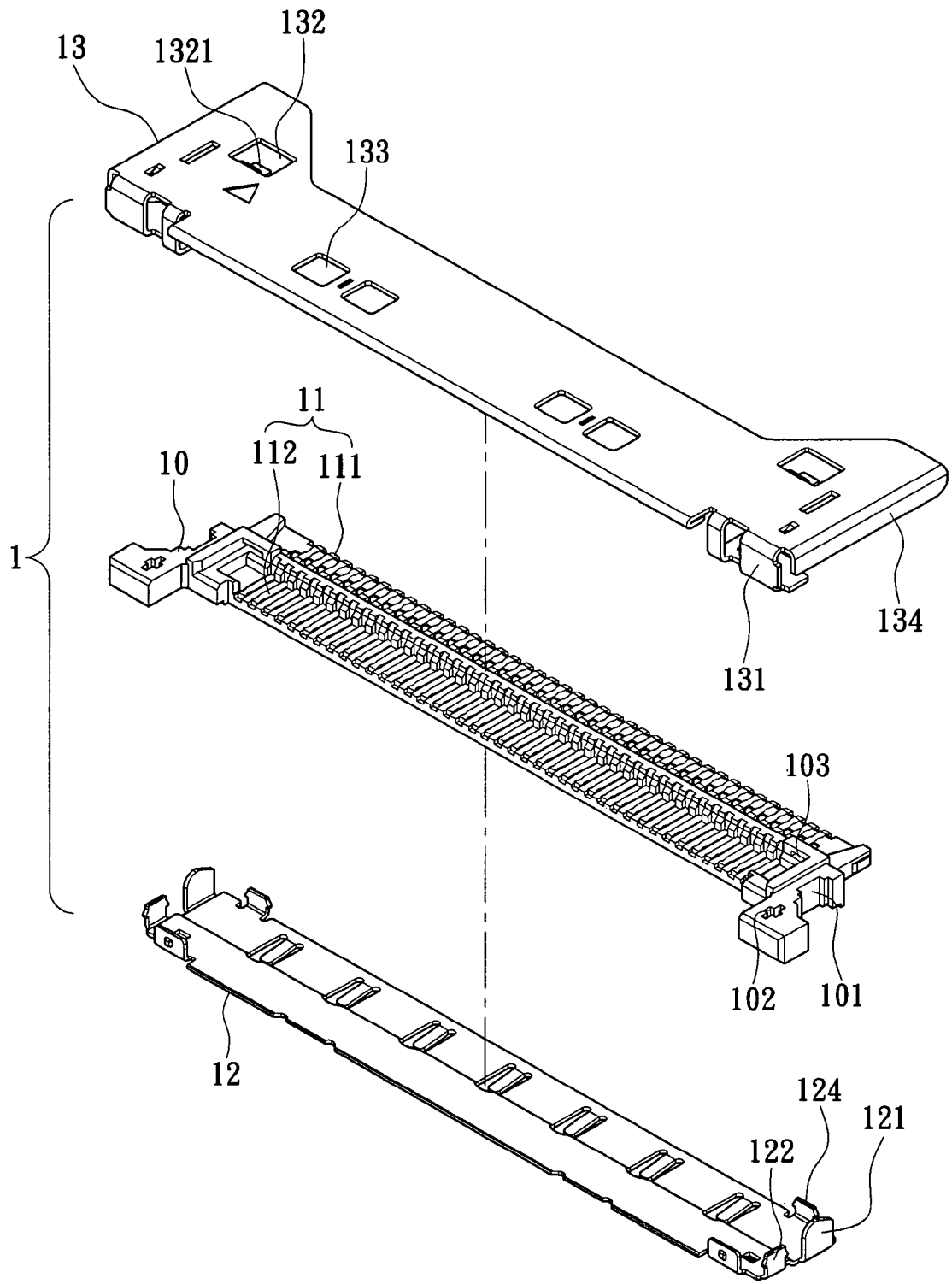
FIG. 5 is an exploded perspective view showing the electrical connector with an aligning means according to the present invention.

Please refer to FIGS. 4 and 5. The present invention provides an electrical connector with an aligning means. The electrical connector 1 with an aligning means is an electrical connector for a light-emitting diode backlight source, which includes an insulating body 10, a plurality of terminals 11, a lower casing 12, and an aligning casing 13. In the present embodiment, the insulating body 10 is a plastic casing. The left and right sides of the insulating body 10 are respectively recessed inwardly to form a trough 101. The insulating body 10 is further provided with two through holes 102 penetrating the top and bottom of the insulating body 10, and two mounting holes 103 penetrating the front and rear sides of the insulating body 10 (FIG. 5).

The terminals 11 are made of metals having good electric conductivity. The terminals 11 are formed together with the insulating body 10 by means of an injection molding process, so that the terminals 11 are fixedly provided on the insulating body 10. Each of the terminals 11 has a contacting portion 111 and a soldering portion 112. The contacting portion 111 is located on the front side of the insulating body 10, and the soldering portion 112 is located at the rear side of the insulating body 10.

The lower casing 12 is a metallic casing and is integrally made by means of pressing. The left and right sides of the lower casing 12 are bent and extend to form two opposite first elastic pieces 121 and two opposite second elastic pieces 122. The two first elastic pieces 121 extend into the troughs 101 on the left and right sides of the insulating body 10, thereby generating a grounding effect. The two second elastic pieces 122 extend into the through holes 102 of the insulating body 10 and are fixed in the through holes 102. The front side of the lower casing 12 is also bent and extends to form two opposite third elastic pieces 124. The two third elastic pieces 124 extend into the insulating body 10 and are fixed therein, so that the lower casing 12 can be fixed in the bottom of the insulating body 10. The bottom of the lower casing 12 is provided with two opposite engaging bodies 123 (FIG. 7).

The aligning casing 13 is also a metallic casing and is integrally made by means of pressing. The front side of the aligning casing 13 is recessed inwardly, while the rear side thereof is bent and extends to form two opposite fasteners 131. Each of the two fasteners 131 has an engaging port 1311 (FIG. 7). The engaging body 123 of the lower casing 12 faces the engaging port 1311 and is engaged in the engaging port 1311. The aligning casing 13 is provided thereon with two openings 132 and a plurality of openings 133. The two openings 132 are close to the left and right sides of the aligning casing 13. One side edge of the opening 132 is bent and extends to form a mounting pin 1321 adjacent to the aligning casing 13 (FIG. 5). The mounting pin 1321 corresponds to the mounting hole 103 of the insulating body 10. The mounting pin 1321 is inserted into the mounting hole 103, so that the aligning casing 13 is fixedly provided on the top of the insulating body 10. The opening 133 is adjacent to the rear side of the aligning casing 13. The soldering portions 112 of the terminals 11 can be soldered to a grounding line (not shown) via the openings 133. The left and right sides of the aligning casing 13 are bent and extend to form two opposite aligning portions 134. The two aligning portions 134 are elongate metallic pieces for positioning/aligning.

Figure 6:
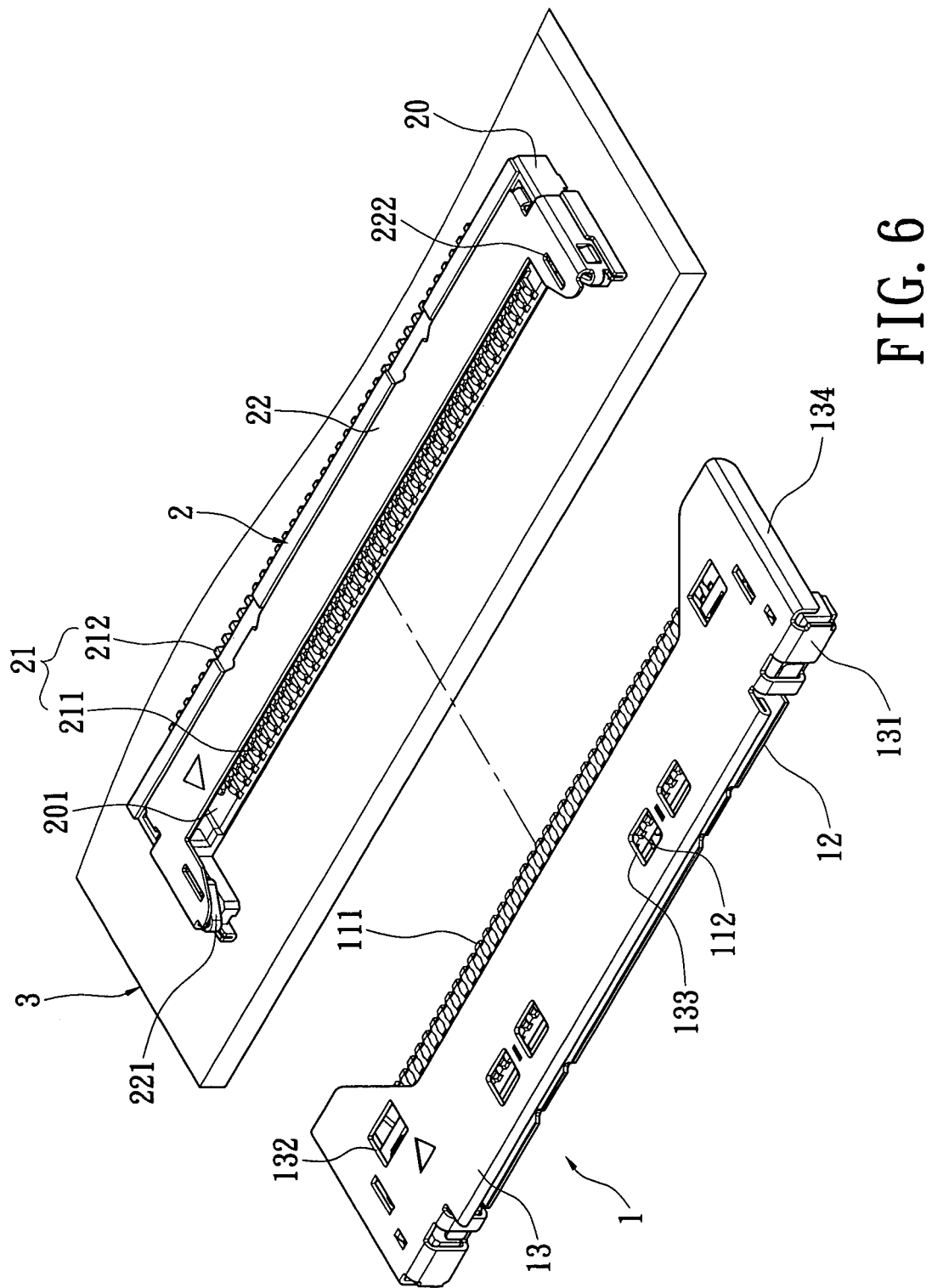
FIG. 6 is a schematic view showing an assembly combination of the electrical connector with an aligning means according to the present invention.
Figure 7:
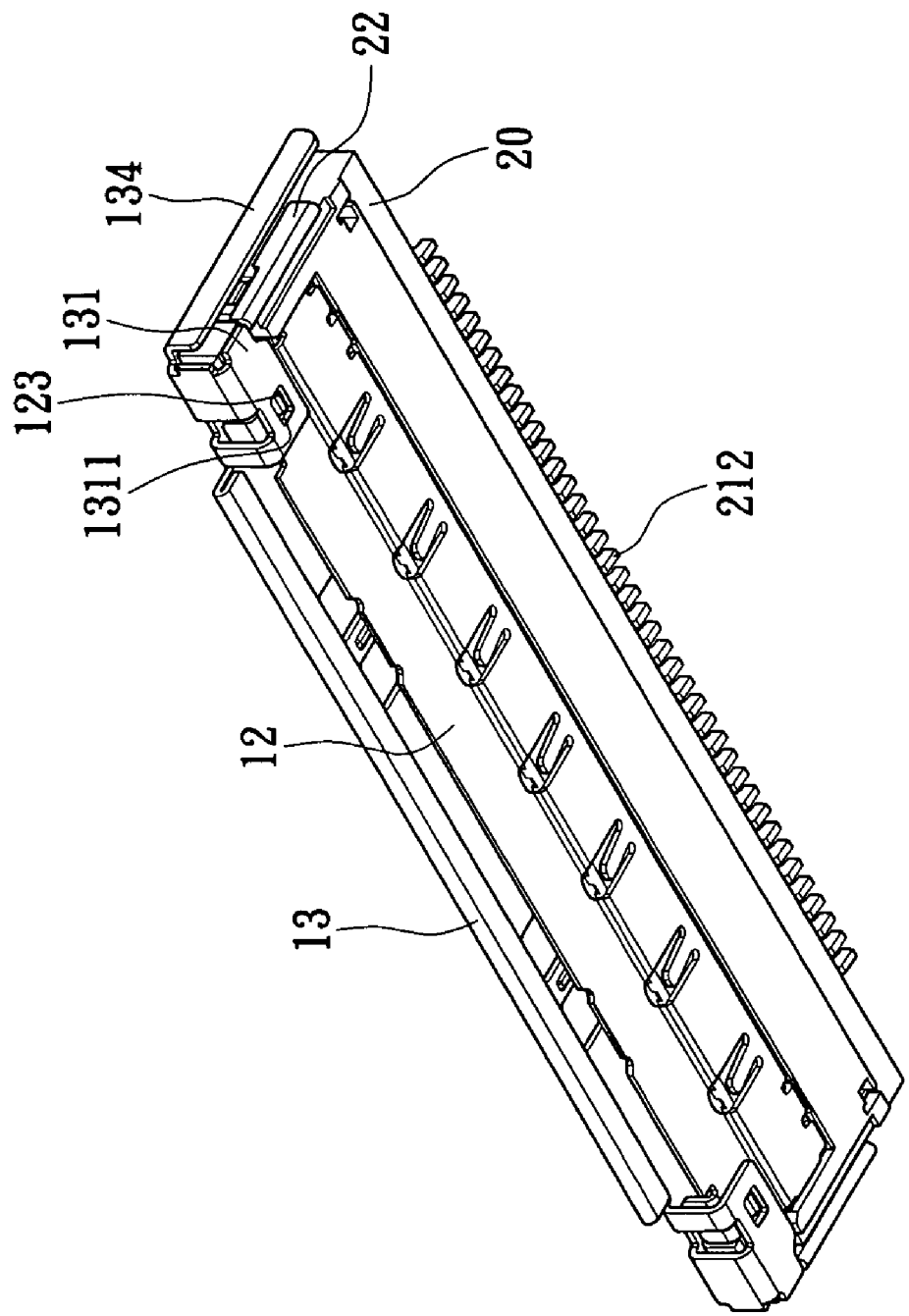
FIG. 7 is a perspective view showing an assembly combination of the electrical connector with an aligning means according to the present invention.
Figure 8:
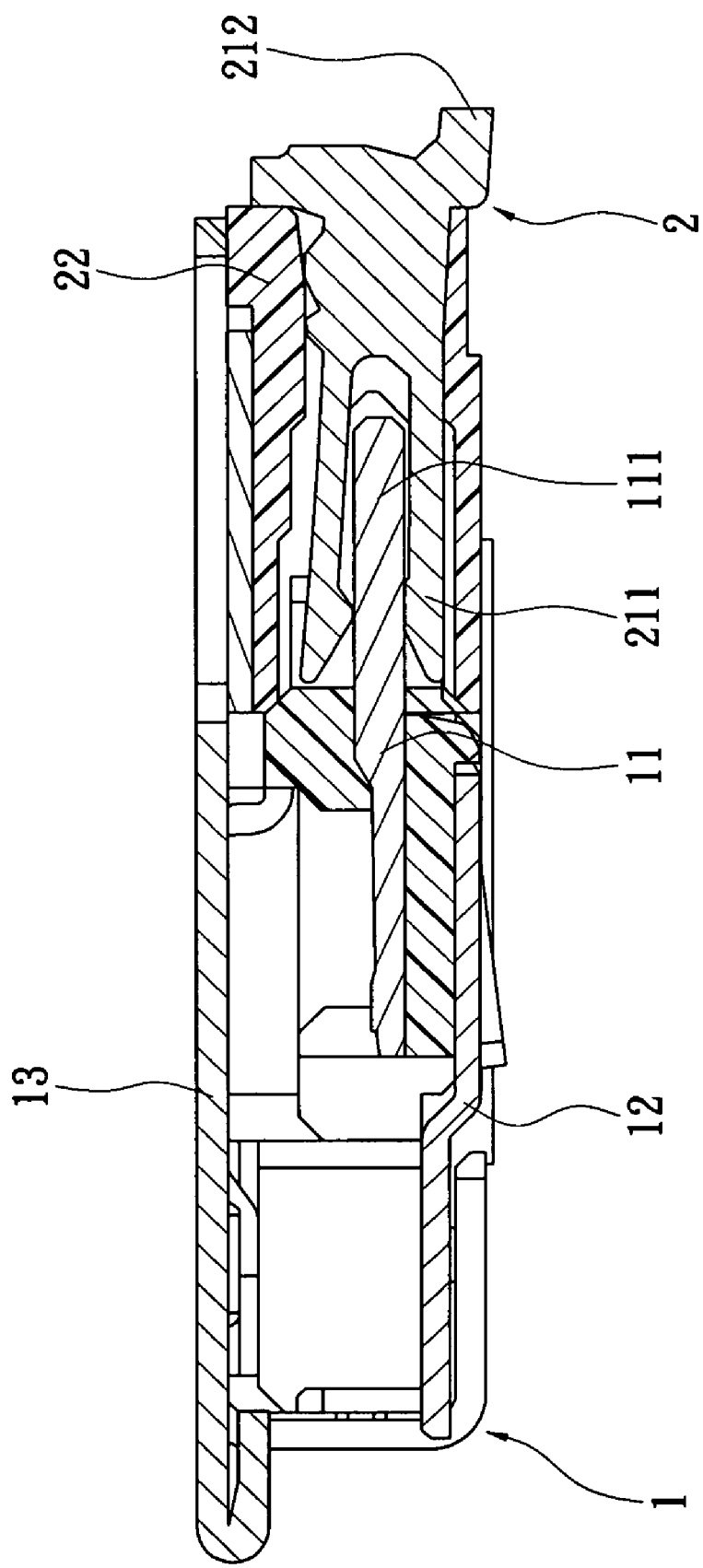
FIG. 8 is a cross-sectional view showing an assembly combination of the electrical connector with an aligning means according to the present invention.

Please refer to FIGS. 6 to 8. The present invention further provides an assembly combination of an electrical connector with an aligning means. The assembly combination of an electrical connector with an aligning means is an assembly combination of an electrical connector for a backlight source of a light-emitting diode, which includes the above-mentioned electrical connector 1 with an aligning means and a docking connector 2. The docking connector 2 is inserted with the electrical connector 1 with an aligning means. The docking connector 2 has an insulating body 20, a plurality of docking terminals 21, and a metallic casing 22. In the present embodiment, the insulating base 20 is made of plastic with its front side having an insertion slot 201. The front side of the electrical connector 1 with an aligning means can be inserted into the insertion slot 201. The docking terminals 21 are provided on the insulating base 20. The docking terminal 21 has a clamping portion 211 and a soldering portion 212. The clamping portion 211 is located on a front end of the insulating base 20. The clamping portion 211 clamps the contacting portion 111, so that the electrical connector 1 with an aligning means and the docking connector 2 can be electrically connected to each other. The soldering portion 212 of the docking terminal 21 is located at the rear end of the insulating base 20, and is used to be soldered on a printed circuit board 3. The metallic casing 22 covers the docking terminals 21 and the insulating base 20. The left and right sides of the metallic casing 22 are bent and extend to form two elastic arms 221. The two elastic arms 221 abut the insulating body 10 and have a grounding effect. The top of the metallic casing 22, adjacent to its two sides, has respectively provided two rectangular engaging holes 222. The first elastic piece 121 extends into the engaging hole 222 to be fixed therein.

Since the distance between the two aligning portions 134 of the aligning casing 13 is slightly larger than the size of the metallic casing 22, when the electrical connector 1 with an aligning means is inserted into the docking connector 2, the two aligning portions 134 will abut and thus slightly press the left and right sides of the metallic casing 22, thereby generating a positioning/aligning effect.

In the present invention, the terminals 11 are fixedly provided on the insulating body 10 by means of an injection molding process, the steps required for the assembling process can be reduced. Since the left and right sides of the aligning casing 13 are bent and extend to form two opposite aligning portions 134, the two aligning portions 134 can abut the left and right sides of the metallic casing 22, thereby generating a positioning/aligning effect. In this way, the electrical connector 1 with an aligning means can be inserted into the docking connector more quickly, thereby reducing the work hours required for assembling.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical connector having aligning means for mating with a docking connector having two docking portions extending from both sides thereof, the electrical connector comprising:
    an insulating body;
    a plurality of terminals provided on the insulating body, each terminal having a contacting portion;
    a lower casing provided at the bottom of the insulating body; and
    an aligning casing provided on the top of the insulating body corresponding to the lower casing for enclosing the insulating body, the vicinity of both sides of the aligning casing being respectively provided with an opening, one side edge of each opening being bent in an L-shape and extending to form a mounting pin with respect to the aligning casing, wherein the contacting portions of the terminals at least partially expose outside the aligning casing and facing the docking connector, wherein both sides of the aligning casing comprise a pair of extended portions having downwardly-bent side walls forming two opposing aligning portions, wherein the pair of extended portions extend forward for correspondingly aligning with the two docking portions of the docking connector;

wherein the width between the both sides of the aligning casing is approximately larger than the width between both sides of the docking connector, wherein the length of each both side of the aligning casing is approximately greater than the length of the docking portions of the docking connector, and wherein the aligning portions of the aligning casing correspondingly cover and abut both sides of the docking connector.

2. The electrical connector with an aligning means according to claim 1, wherein the aligning portion is an elongate metallic piece.

3. The electrical connector with an aligning means according to claim 1, wherein the terminals are fixedly provided on the insulating body by means of an injection molding process.

4. The electrical connector with an aligning means according to claim 1, wherein the insulating body is provided with a mounting hole to correspond to the mounting pin, the mounting pin is inserted into the mounting hole.

5. The electrical connector with an aligning means according to claim 1, wherein the rear side of the aligning casing has two fasteners, the fastener is provided with an engaging port, the bottom of the lower casing is provided with an engaging body to correspond to the engaging port, the engaging body is engaged in the engaging port.

6. The electrical connector with an aligning means according to claim 1, wherein the electrical connector with an aligning means is an electrical connector for a light-emitting diode backlight source.

7. An assembly combination of an electrical connector having aligning means, comprising:
a docking connector having an insulating base, a plurality of docking terminals, and a metallic casing,
wherein the insulating base has an insertion slot,
wherein the docking terminals are provided on the insulating base, each docking terminal has a contacting portion,
wherein the metallic casing covers the docking terminals and the insulating base,
wherein the contacting portions of the docking terminals are disposed outside the metallic casing,
wherein both sides of the metallic casing extend to form two docking portions;
and
an electrical connector having aligning means for coupling with the docking connector, the electrical connector comprising:
an insulating body,
a plurality of terminals provided on the insulating body, each terminal having a contacting portion,
a lower casing provided at the bottom of the insulating body, and
an aligning casing provided on the top of the insulating body corresponding to the lower casing for enclosing the insulating body, the vicinity of both sides of the aligning casing being respectively provided with an opening, one side edge of each opening being bent in an L-shape and extending to form a mounting pin with respect to the aligning casing, wherein the contacting portions of the terminals at least partially expose outside the aligning casing and facing the docking connector, wherein both sides of the aligning casing comprise a pair of extended portions having downwardly-bent side walls forming two opposing aligning portions, wherein the pair of extended portions extend forward for correspondingly aligning with the two docking portions of the docking connector, wherein the terminals of the electrical connector being inserted into the insertion slot and electrically connected with the docking terminals, the aligning portion of the aligning casing abutting on both docking portions of the metallic casing;

wherein the width between the both sides of the aligning casing is approximately larger than the width between both sides of the docking connector, wherein the length of each both side of the aligning casing is approximately greater than the length of the docking portions of the docking connector, and wherein the aligning portions of the aligning casing correspondingly cover and abut both sides of the docking connector.

8. The combination of an electrical connector with an aligning means according to claim 7, wherein the aligning portion is an elongate metallic piece.

9. The assembly combination of an electrical connector with an aligning means according to claim 7, wherein the terminals of the electrical connector with an aligning means are fixedly provided on the insulating body by means of an injection molding process.

10. The assembly combination of an electrical connector with an aligning means according to claim 7, wherein the insulating body is provided with a mounting hole to correspond to the mounting pin, the mounting pin is inserted into the mounting hole.

11. The assembly combination of an electrical connector with an aligning means according to claim 7, wherein the rear side of the aligning casing has two fasteners, the fastener is provided with an engaging port, the bottom of the lower casing is provided with an engaging body to correspond to the engaging port, the engaging body is engaged in the engaging port.

12. The assembly combination of an electrical connector with an aligning means according to claim 7, wherein the front side of the docking terminal has a clamping portion, the front side of the terminal of the electrical connector has a contacting portion, the clamping portion clamps the contacting portion.

13. The assembly combination of an electrical connector with an aligning means according to claim 7, wherein the combination of an electrical connector with an aligning means is a combination of an electrical connector for a light-emitting diode backlight source.

* * * * *